US006856768B2

(12) United States Patent
Gnauck et al.

(10) Patent No.: US 6,856,768 B2
(45) Date of Patent: Feb. 15, 2005

(54) DYNAMIC ADD/DROP OF CHANNELS IN A LINEAR-OPTICAL-AMPLIFIER-BASED WAVELENGTH-DIVISION-MULTIPLEXED SYSTEM

(75) Inventors: Alan H. Gnauck, Middletown, NJ (US); Leonard Henri Spiekman, Eindhoven (NL); Jay M. Wiesenfeld, Lincroft, NJ (US)

(73) Assignee: AT&T Corp., New York, NY (US)

( * ) Notice: Subject to any disclaimer, the term of this patent is extended or adjusted under 35 U.S.C. 154(b) by 493 days.

(21) Appl. No.: 09/796,729

(22) Filed: Mar. 2, 2001

(65) Prior Publication Data

US 2002/0021861 A1 Feb. 21, 2002

Related U.S. Application Data

(60) Provisional application No. 60/186,906, filed on Mar. 3, 2000.

(51) Int. Cl.[7] ........................ H04J 14/02; H04B 10/00
(52) U.S. Cl. ........................................ 398/83; 398/160
(58) Field of Search .......................... 398/82, 83, 192, 398/160, 141; 359/344

(56) References Cited

U.S. PATENT DOCUMENTS

| | | | | |
|---|---|---|---|---|
| 6,268,955 B1 | * | 7/2001 | Shimojoh et al. | 359/337.2 |
| 6,433,904 B1 | * | 8/2002 | Swanson et al. | 398/91 |
| 6,466,341 B1 | * | 10/2002 | Lumish et al. | 398/82 |
| 6,473,212 B1 | * | 10/2002 | Chraplyvy et al. | 398/79 |
| 6,538,783 B1 | * | 3/2003 | Stephens | 398/82 |

OTHER PUBLICATIONS

Sun, et al., "Average Inversion Level, Modeling, Physics of Erbium–Doped Fiber Amplifiers", IEEE Journal of Selected Topics in Quantum Electronics, Aug., 1997, pp. 991–1007.

Srivastava, et al., "EDFA Transient Response to Channel Loss in WDM Transmission System", IEEE Photonics Technology Letters, Mar., 1997, pp. 386–388.

Zhao et al., "Gain Clamped Erbium–Doped Fiber Amplifiers–Modeling and experiment", IEEE Journal of Selected Topics in Quantum Electronics, Aug., 1997, pp. 1008–1012.

Yu et al., "Design and Modeling of Laser–Controlled Erbium–Doped Fiber Amplifiers", IEEE Journal of Selected Topics in Quantum Electronics, Aug., 1997, pp. 1013–1018.

Takahashi, et al. "An Output Power Stabilized Erbium-Doped Fiber Amplifier with Automatic Gain Control", IEEE Journal of Selected Topics in Quantum Electronics, Aug., 1997, pp. 1019–1026.

Richards, et al. "A Theoretical Investigation of Dynamic All–Optical Automatic Gain Control In Multichannel EDFA's and EDFA Cascades", IEEE Journal of Selected Topics in Quantum Electronics, Aug., 1997, pp. 1027–1036.

(List continued on next page.)

Primary Examiner—Leslie Pascal
Assistant Examiner—Dalzid Singh

(57) ABSTRACT

A system and method is provided for minimizing power fluctuations and crosstalk in a wavelength division multiplexed optical (WDM) network employing dynamic add/drop techniques by utilizing amplifiers operating in a nearly linear region. Conventionally, erbium-doped fiber amplifiers (EDFAs) are operated in saturation for providing signal amplification in a WDM network. Instead of using saturated EDFAs, the present invention includes optical amplifiers operated in a linear or nearly linear regime for providing signal amplification in a dynamic add/drop or bursty data WDM network. By operating optical amplifiers in a linear or nearly linear regime, power fluctuations, transients and crosstalk caused by adding/dropping or switching channels in the WDM network are minimized. Raman amplifiers, EDFAs, or semiconductor optical amplifiers (SOAs) can all be operated in a linear or nearly linear range to provide linear amplification in such a dynamic add/drop or bursty data WDM network.

15 Claims, 6 Drawing Sheets

OTHER PUBLICATIONS

Sun et al. "Error–Free Transmission of 32 ×2.5 Gbit/s DWDM Channels Over 125 km Using Cascaded In–Line Semiconductor Optical Amplifiers", *Electronic Letters*, vol. 35, p. 1863, 1999.

Hyang K. Kim et al., Reduction of Cross–Gain Modulation in the SOA by using Wavelength Moduated Signal, *IEEE Photon. Technological Letters 36*. 12 10/00, pp/ 1412–1414.

Spiekman et al., "8×10 Gb/s DWDM Transmission over 240 km of Standard Fiber Using a Cascade of SOA's", *IEEE Photon. Technological Letters 12*. 8, 8/00, pp. 1082–1084.

Spiekman et al., Transmission of 8 DWDM Channels at 20 Gb/s over 160 km of Standard Fiber Using a Cascade of Semiconductor Optical Amplifiers, *IEEE Photon. Technological Letters* 12, 6, 6/00, pp. 717–719.

* cited by examiner

DYNAMIC ADD/DROP OF CHANNELS IN A LINEAR-OPTICAL-AMPLIFIER-BASED WAVELENGTH-DIVISION-MULTIPLEXED SYSTEM

This application claims the benefit of prior U.S. Provisional Application Ser. No. 60/186,906 filed Mar. 3, 2000.

TECHNICAL FIELD OF THE INVENTION

The present invention generally relates to wavelength division multiplexed, optical networks. More particularly, the present invention relates to providing optical amplifiers in a wavelength-division multiplex transmission system operating in the linear, rather than the saturated, regime for amplification whereby signals may be added or dropped without substantial degradation of through channel signals.

BACKGROUND OF THE INVENTION

In the last decade, fiber-optics-based transmission systems have become ubiquitous, due in part to their large bandwidth and high data rate capability. Wavelength-division-multiplexed (WDM) networks employ a transmission technique that allows multiple wavelengths (i.e., channels) to be transmitted on a single fiber and further increases the bandwidth of an optical transmission network. Conventional WDM networks use erbium-doped fiber amplifiers (EDFAs) for providing amplification throughout a WDM network. For example, signal amplification may be necessary for maintaining an adequate signal-to-noise ratio (SNR) for optical transmission over long distances and between multiple network nodes. EDFAs provide signal amplification without requiring the signal to be converted to an electrical signal, amplified, and then converted back to an optical signal.

FIG. 1 illustrates the gain compression of a conventional EDFA. An EDFA in an optical network is conventionally operated in saturation regime A, where the largest output power is available. Moreover, in this saturation regime A, the output power can be maintained despite fluctuations in input power. Typical EDFA's used in telecommunications begin to saturate at an output power of one-to-several milliwatts. EDFA's typically reach output powers of 50–200 milliwatts when operated in a highly saturated condition. These ranges are typical and are not to be appreciated as limiting as EDFA's may be designed to still greater output power level ranges. The present large range between the output power at the onset of saturation and the largest possible output power available is a consequence of the physics of optically pumping the three level Erbium-ion system of a conventional EDFA.

Although operation of EDFA's in saturation has the above-mentioned advantage of maintaining total output power at a given level, it also has several drawbacks. The gain, as a function of wavelength, changes as the degree of saturation changes. Also, the total output power is shared by the channels. If a channel is added to a transmission system employing EDFA's, the power per channel drops. Similarly, if a channel is dropped, the power in each remaining channel increases. This change in output power takes place on a time scale of about 10–100 microseconds after the channel is added or dropped. Thus, if channels are added or dropped or if one or more channels has "bursty" data (e.g. packetized data), the output power in the channel(s) will change during that time (i.e., until the amplifier reaches a new steady-state operating condition). This time-dependent problem associated with reaching a steady-state condition when using EDFA's in a WDM network is discussed further by Sun, et al., in an article entitled, "Average Inversion Level, Modeling, and Physics of Erbium-Doped Fiber Amplifiers", IEEE Journal of Selected Topics in Quantum Electronics, August, 1997, pp. 991–1007 and by Srivastava, et al., in an article entitled "EDFA Transient Response to Channel Loss in WDM Transmission System", IEEE Photonics Technology Letters, March, 1997, pp. 386–388.

Many schemes have been proposed to accommodate this transient response. Sun, et al., for example, disclose a technique for modeling the time-dependant gain of EDFAs, which can be used to design a WDM network.

Zhao et al., in an article entitled "Gain Clamped Erbium-Doped Fiber Amplifiers-Modeling and Experiment", IEEE Journal of Selected Topics in Quantum Electronics, August, 1997, pp. 1008–1012 and Yu et al., in an article entitled, "Design and Modeling of Laser-Controlled Erbium-Doped Fiber Amplifiers", IEEE Journal of Selected Topics in Quantum Electronics, August, 1997, pp. 1013–1018 disclose controlling EDFA gain by introducing lasing at a particular wavelength.

Takahashi, et al., in an article entitled "An Output Power Stabilized Erbium-Doped Fiber Amplifier with Automatic Gain Control", IEEE Journal of Selected Topics in Quantum Electronics, August, 1997, pp. 1019–1026, disclose controlling the gain of an EDFA by using a preamplifier system for stabilizing the input power of an EDFA.

Richards, et al., in an article entitled "A Theoretical Investigation of Dynamic All-Optical Automatic Gain Control in Multichannel EDFA's and EDFA Cascades", IEEE Journal of Selected Topics in Quantum Electronics, August, 1997, pp. 1027–1036, examine the effects of adding/dropping channels on a chain of EDFA's and examine the effectiveness of lasing to stabilize the chain.

Recently, it has been shown that semiconductor optical amplifiers (SOA's), instead of EDFA's, can be used for WDM networks. SOA's offer potential advantages over EDFA's, such as low cost and ease of integration with other devices and platforms. When SOA's are operated under saturation, the SOA's are constrained by the power sharing affects mentioned above for EDFA's when channels are added or dropped. In addition, saturated SOA's suffer from high-frequency (several gigahertz) gain-response time that can cause crosstalk and pulse distortion on a bit-period time scale. This has made it very difficult to employ saturated SOA's in WDM systems. In general, to maximize the capacity of WDM systems, output power from the amplifier as large as possible (consistent with limits set by optical fiber nonlinear effects) is desired. This desire would drive the choice of operating conditions into the saturated region of operation of the amplifier.

Sun et al., in an article entitled "Error-Free Transmission of 32×2.5 Gbit/s DWDM Channels Over 125 km Using Cascaded In-Line Semiconductor Optical Amplifiers", *Electronic Letters*, vol. 35, p. 1863 (1999), disclose using a reservoir channel to minimize power fluctuations and reduce crosstalk in a WDM system. Sun et al. operate the SOA's in saturation, and the reservoir channel is used to clamp the optical gain below a predetermined level so that data on one WDM channel has a lessened crosstalk effect on the other channels.

Other methods to reduce crosstalk between modulated channels in saturated SOA's that involve polarization multiplexing (see S. Banerjee, A. K. Srivastava, B. R. Eichenbaum, C. Wolf, Y. Sun, J. W. Sulhoff and A. R. Chraplyvy, "Polarization Multiplexing Technique to Mitigate WDM Crosstalk in SOA's," in *Proc. ECOC '99*, Nice, France, 9/99, paper PD3–9, pp. 62–63 and J. Yu, X. Zheng and P. Jeppesen, *OSA Topical Meeting on Optical Amplifiers and their Applications*, Quebec, Canada, 7/00, paper 0TuB2) or frequency-division multiplexing of complementary channels have been proposed (see Hyang K. Kim and S. Chandrasekhar, "Reduction of Cross-Gain Modulation in the SOA by Using Wavelength Modulated Signal," *IEEE Photon. Technol. Lett.* 12.10, 10/00, pp. 1412–1414).

L. Spiekman et al., (the present inventors) in one of other articles cited in this paragraph and not to be considered as prior art to the present application entitled "DWDM transmission of thirty-two 10 Gbits/s channels through 160 km Link Using Semiconductor Optical Amplifiers," *Electron. Lett.* 36.12, 6/00, pp. 1046–1047 disclose WDM transmission using SOA's either operated with a reservoir channel or operated very lightly in saturation to reduce crosstalk. In other recent work, the present inventors have demonstrated that operation of SOA's in the very light saturation regime is effective for high-capacity WDM systems operating at 10 or 20 Gbits/s"; (see Spiekman et al., "8×10 Gb/s DWDM Transmission over 240 km of Standard Fiber Using a Cascade of SOA's," *IEEE Photon. Technol. Lett.* 12.8, 8/00, pp. 1082–1084 and "Transmission of 8 DWDM Channels at 20 Gb/s over 160 km of Standard Fiber Using a Cascade of Semiconductor Optical Amplifiers," *IEEE Photon. Technol. Lett.*, 12, 6, 6/00, pp. 717–719. These articles by Spiekman et al. should be deemed to be incorporated by reference as to their entire contents for an understanding of the present invention.

In WDM networks, it would be beneficial to add or drop channels, for example, at network nodes, thus increasing flexibility over conventional point-to-point transmission systems including intermediate nodes where no adding or dropping would be typically permitted due to the adverse transient effects. As described above, EDFA's operated in their normal, saturation regime will be unsuitable for this application. None of the prior art schemes described above address the issue of the viability of using SOA's operating in a linear mode in a dynamic add/drop WDM network. Consequently, a need exists for controlling transient power response in a dynamic add/drop network.

SUMMARY OF THE INVENTION

It is an aspect of the present invention to provide a dynamic add/drop WDM communication system and method that utilizes optical amplifiers while minimizing power fluctuations and crosstalk.

In accordance with this aspect of the present invention, a system and method are provided for operating optical amplifiers in a linear or nearly linear regime, rather than in a saturation regime, for a dynamic add/drop WDM network. By operating optical amplifiers in a linear or nearly linear regime, variations in the power of each channel caused by adding/dropping a channel are minimized and through channels are not substantially impacted by the adding or dropping of other channels. Consequently, linear operation of optical amplifiers of a WDM system supports a simple, dynamic add/drop WDM communication system, which requires rapid rearrangement of traffic on independent wavelength channels of the system. Similarly, the linear operation of an optical point-to-point system employing one or more amplifiers operated in a nearly linear regime enables arbitrary, on/off, channel switching, as with bursty data (e.g., transmission of packets) which normally would cause detrimental transient effects as well.

Consequently, a method of transmitting at least one optical signal according to the present invention, the optical signal comprising at least one through channel and a switched channel in an optical network including at least one optical amplifier, comprises the steps of: transmitting the at least one through signal and amplifying the at least one transmitted through signal using a linear amplification regime of said at least one amplifier, the through channel experiencing insubstantial transient impact from the switched channel, wherein a switched channel broadly refers to adding or dropping a channel or on/off switching a channel other than said through channel as with bursty or packet data optical transmission.

BRIEF DESCRIPTION OF THE DRAWINGS

The present invention is illustrated by way of example and not to be deemed limited to the embodiments in the accompanying figures in which like reference numerals indicate similar elements and in which.

DETAILED DESCRIPTION OF THE INVENTION

Figure 2:
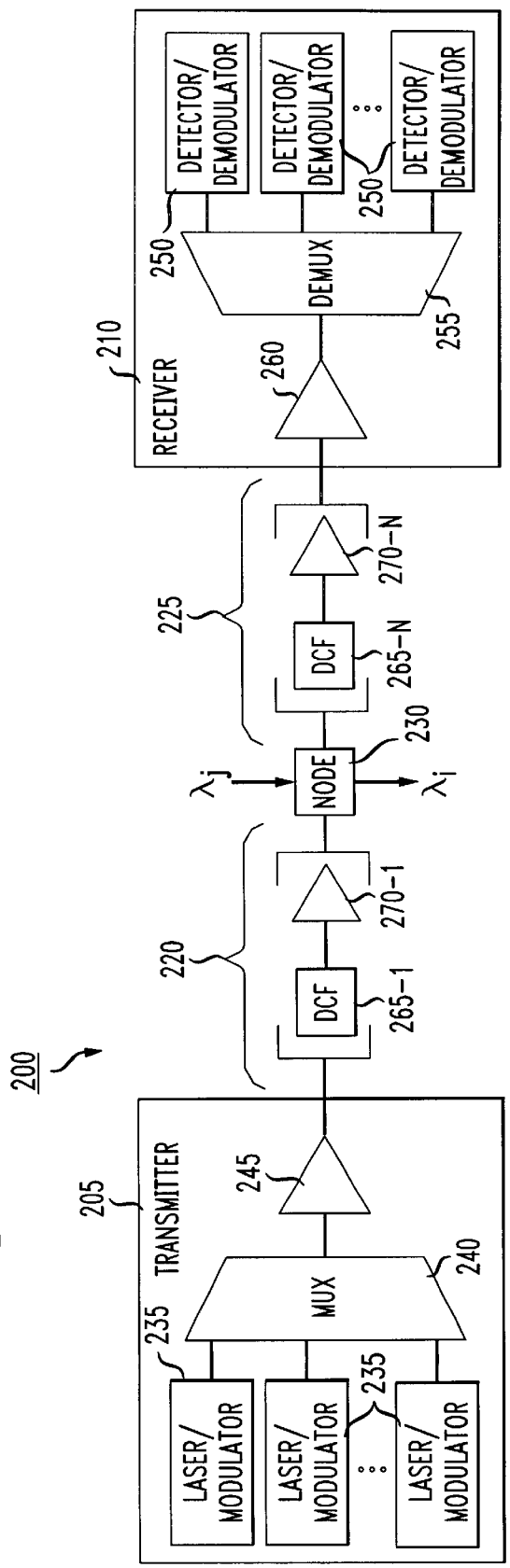
FIG. 2 illustrates a communication system of the present invention including optical amplifiers operating in a linear mode (non-saturation mode) whereby channels may be added or dropped, for example, at an intermediate optical node or transient effects caused by the loss of a laser at a transmitter will not adversely impact transmission.
Figure 3:
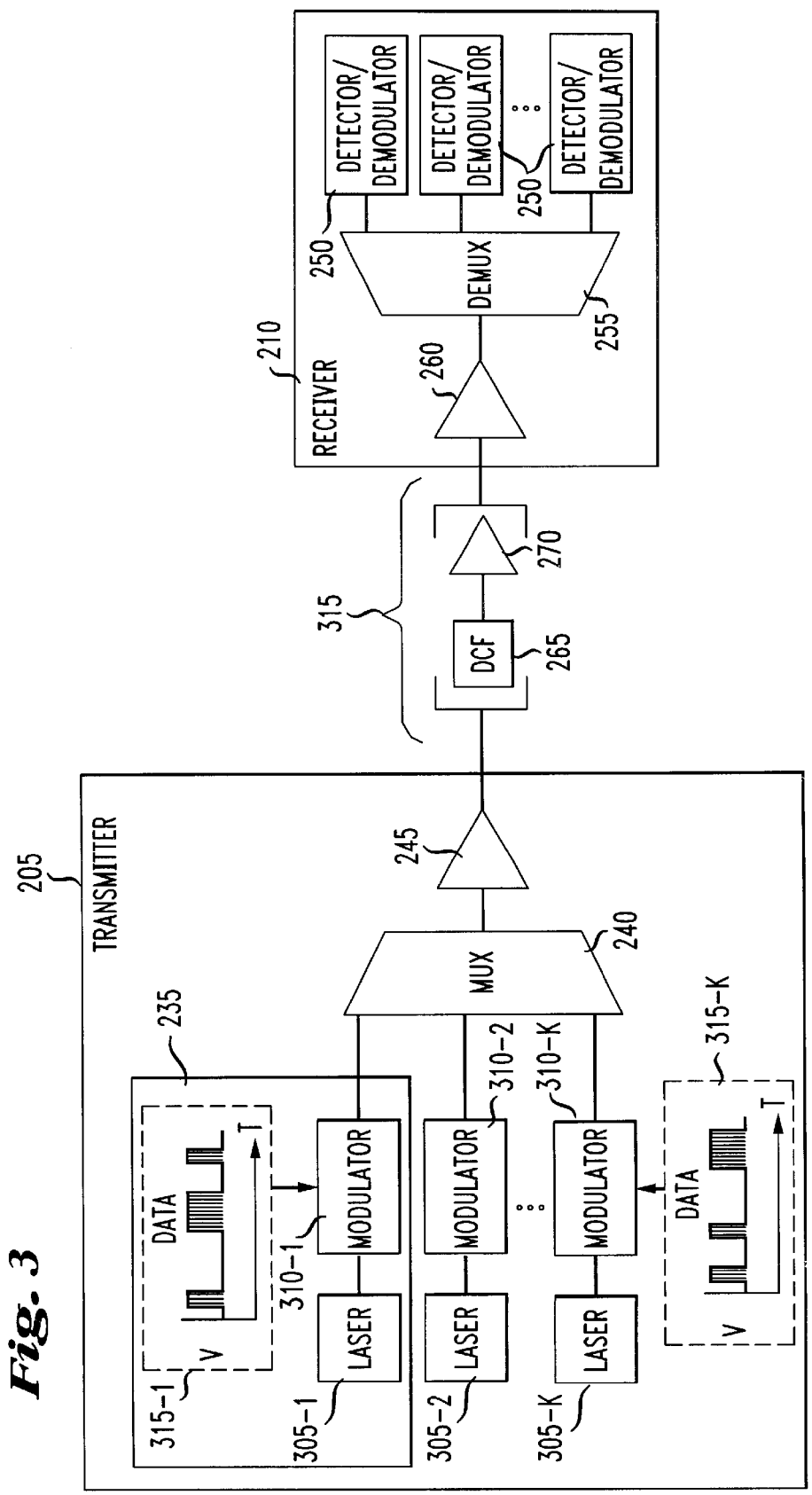
FIG. 3 illustrates a communications system of the present invention including optical amplifiers operating in a linear mode in which bursty data, for example, packet data, is transmitted over one channel having no adverse impact on data transmission on another channel.

FIG. 2 illustrates an exemplary dynamic add/drop waveguide division multiplex (WDM) communication system 200 which may employ the principles of the present invention. The system 200 comprises optical transmission lines 220 and 225, each hop of which lines comprise a long-haul fiber portion, a dispersion-compensating fiber (DCF) portion 265 and an optical amplifier 270. The depicted brackets around fiber/amplifier segments represent the possibility of multiple hops, for example, n hops. There may be multiple hops before and after node 230. Node 230, intermediate the hops, represents a fiber node at which channels at wavelengths 1 . . . j may be added to an N wavelength or channel system and wavelengths 1 . . . i represent channels that may be dropped at the node 230 consistent with channel capacity and utilization at that node. There may be multiple intermediate nodes 230 at which channels may be added or dropped (not shown). Reference numerals herein utilize a first digit representing the first figure a similar element appears in the drawings, for example, the 2 in line 220 represents that the transmission line first appears in FIG. 2 and may appear again with the same reference numeral as a similar element in FIG. 3, a bursty data system, and FIG. 5, our laboratory demonstration set-up. FIGS. 2 and 3 represent applications of the present invention, the use of optical amplifiers in a linear rather than a saturated regime to alleviate the adverse impact of transients or crosstalk in a WDM system while FIG. 5 represents our laboratory demonstration arrangement used to prove the benefits of application of optical amplifiers operated in a linear regime.

Referring to FIG. 2, communication system 200 includes a transmitter 205 connected to receiver 210 via an optical trunk or transmission line having the intermediate add/drop fiber node 230. Transmitter 205 is depicted as including laser/modulators 235 for N wavelengths of channel capacity which are fed to a WDM 240 and an output modulator/amplifier 245. Fewer or more amplifiers may be used in a typical transmission line to provide for transmission distances of tens to hundreds of kilometers, each amplifier serving as a repeater to boost signal power level to effectively maintain a predetermined desirable signal-to-noise ratio. The depicted network may just as easily comprise a portion of an optical ring used in a large metropolitan area data network or a long haul trunking system, each having intermediate add/drop nodes.

Transmitter 205, which may, itself, be an optical node location where optical signals at N different wave lengths may be switched or added or dropped, includes, for example, sixteen conventional distributed feedback (DFB) laser/modulators 235 for transmitting data on channels from 1548 nm to 1560 nm at a spacing of 100 GHz. The number of lasers and channels and channel spacing are merely representative of typical values and are not intended to be limiting. Typically, modulators are provided for each laser to modulate data on each channel wavelength. In our laboratory demonstrations, we used one or two modulators for modulating data, for example, bursty data on to a switched channel as will be further described in the context of FIG. 3 in terms of a communications system and FIG. 5, our laboratory demonstration arrangement.

Continuing with this exemplary embodiment of FIG. 2, laser/modulators 235 are connected to conventional multiplexing circuitry 240 for multiplexing, for example, N WDM channels on trunk line 220. The channels are combined at MUX 240 and fed, for example, in our laboratory demonstration into a conventional lithium-niobate modulator 245, driven with a pseudo-random bit sequence (PRBS) of length 2**31-1 and at a data rate of 10 Gb/s. The WDM signal power may be adjusted using a variable optical attenuator (not shown). The transmitted bit patterns output on the different wavelengths are decorrelated, for example, utilizing an appropriate fiber length of from 4 to 10 Km of standard single mode fiber (SSMF) before application to the line 220.

As indicated above, transmitter 205 is an exemplary transmitter that can be used in communication system 200. Transmitter 205 is not limited to including sixteen DBF lasers for transmission at a data rate of 10 GB/s per channel on the trunk line toward add-drop fiber node 230. Transmitter 205 may include a larger or smaller number of lasers for transmitting more or fewer WDM channels (e.g., eight or sixteen WDM channels) at different data rates on different wavelengths at different channel spacings.

Transmitter 205 can add or drop WDM channels as can fiber node 230. There may be more than one intermediate fiber node 230 at which node channel(s) are added or dropped. For example, transmitter 205 can operate in burst mode for transmitting bursty traffic data (e.g., data packets) as will be further discussed with reference to FIG. 3. From one to the full complement of laser/modulators 235 may toggle on/off depending on whether one or more packetized data signals is available for transmission to receiver 210. For example, transmitter 205 can be configured for transmitting bursty traffic on eight of the channels and for transmitting continuously on the remaining eight of the sixteen channels. Additionally, transmitter 205 may comprise a switching fiber node whereby a channel may be added or dropped by transmitter 205, or dropped unintentionally, for example, when one of the lasers of laser/modulators 235 fails.

Receiver 210 can similarly operate as a switching node and add or drop channels, intentionally or unintentionally, for example, when an optical receiver fails.

Receiver 210 may include in the depicted embodiment, a demodulator/amp 260, a DEMUX 255 and a plurality of detector/demodulators 250 of which K are shown indicating that the number of channels or wavelengths transmitted need not be the number of channels received. In our laboratory demonstration embodiment per FIG. 5, a 0.25 nm bandpass filter 520 for selecting a single WDM channel and a photodiode receiver 540 for receiving the selected WDM channel were used. There may be plural such filters and receivers for each channel to be received, for example, sixteen.

Receiver 210 is an exemplary receiver that can be used in communication system 200, and may include other conventional circuitry besides a demodulator/detector or filter and optical receiver (for example, amplifiers and attenuators may be used for adjusting power levels in receiver 210 and/or bandpass filters for selecting longer or shorter wavelengths).

Referring to FIG. 3, intending to show the transmission of bursty data on channels at a first wavelength and a Kth wavelength, optical trunk 315 includes, for example, 4×40 km spans of SSMF. These are shown as bracketed spans including DCF fiber portion 265 and amplifier portion 270 consistent with FIG. 1 respectively. Transmitter 205 is shown comprising a laser 305, modulator 310 and data source 315 for wavelength channel 1, other laser/modulators for other channels and a laser 305, a modulator 310 and a data source 315 of bursty data which has little adverse impact on data transmission on channel 1. Each span includes, for example, one semiconductor optical amplifier (SOA) 270 operated in a linear regime according to the principles of the present invention. The bursty data transmission on channel K will have no adverse impact on channel 1 so long as amplifiers utilized at the transmitter, in the transmission line and at the receiver are operated in a near linear regime. A small degradation in Q factor has been demonstrated when communication system 200 operates eight of sixteen WDM channels in a simulated bursty data mode.

Figures 5A, 5B:
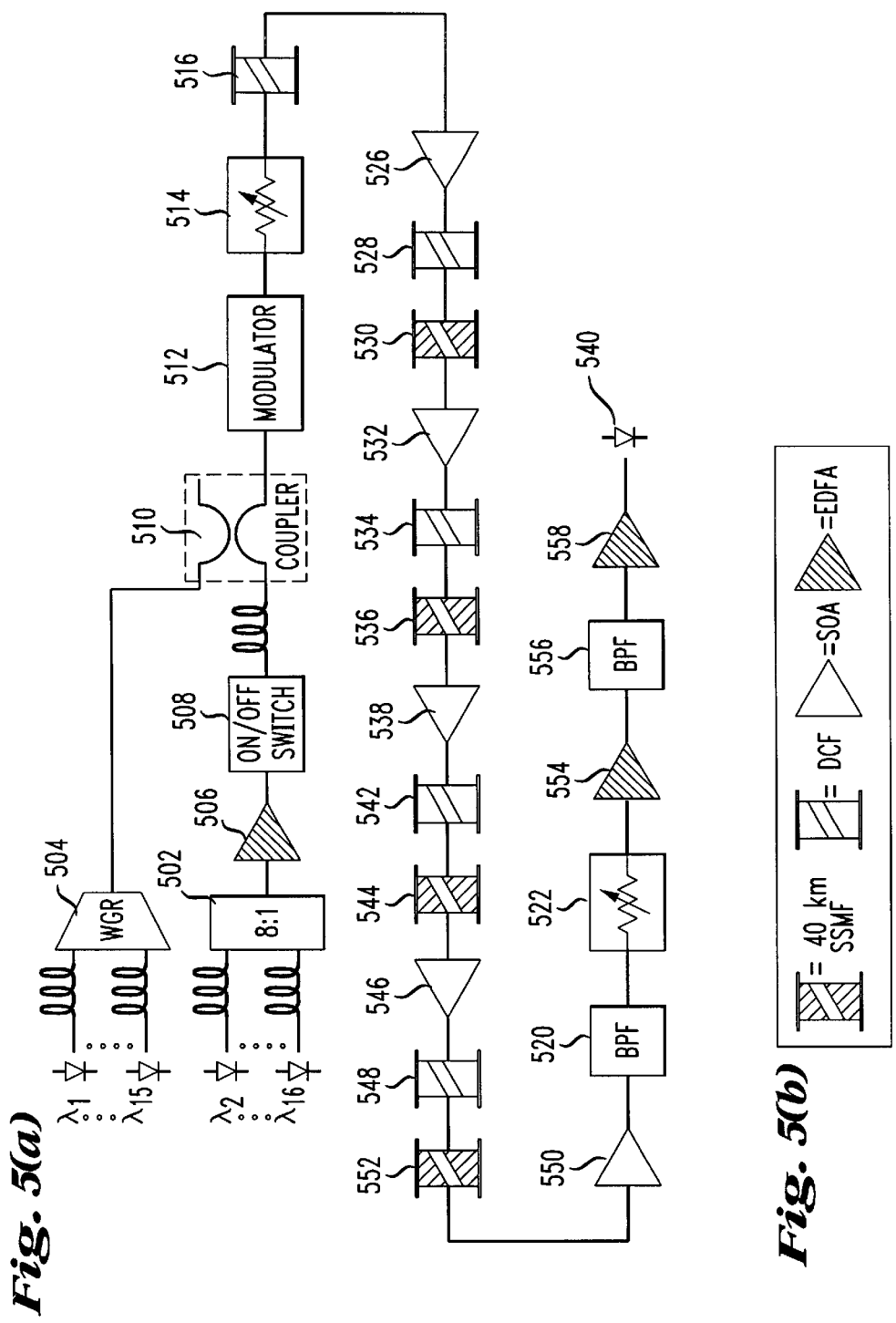
FIG. 5 illustrates a communications system utilized in a laboratory demonstration of the principles of the present invention where FIG. 5(*a*) shows the experimental set-up and FIG. 5(*b*) is a key to the symbols used in FIG. 5(*a*).

In our laboratory demonstration system per FIG. 5, we utilized four forty kilometer hops of a transmission line. FIG. 5(a) shows a key for understanding depicted elements. At a transmitter, we combined eight even-channel lasers in an 8 to 1 coupler 502 and amplified them with an EDFA 506 while the eight odd channels were fed to WGR 504. A switch 508 was used to switch on/off the eight even channels prior to a 3 dB coupler 510 for combining the eight even and eight odd channels for transmission. In the transmission line, semiconductor optical amplifier 526 boosts signal power into 40 kilometers of standard single mode fiber (SSMF) 528 which is compensated by DCF 530 prior to being amplified again at semiconductor optical amplifier 532. SOAs 526, 532, 538 and 546 compensate for a typical 13 dB power loss in each forty kilometer span of fiber. An optical trunk, as described above, may optionally include a terminating semiconductor optical amplifier SOA 260, 550 for boosting signal power just prior to a signal receiver. In our laboratory demonstration set-up, SOA 550 was utilized to boost signal power for allowing measurement of signal quality characteristics, such as Q factor (Q factor is essentially a signal-to-noise ratio for a received channel).

SOAs 270 or 526, 532, 538, 546 or 550 may typically comprise conventional bulk-tensile InGaAsP devices, in the depicted systems, having a gain peak at 1520 nm, a residual power dependence of 1 dB and a saturation output power of +11 db. SOA's utilized in the present invention may also include other types of conventional SOA's that are configured for the power requirements, span lengths and channel parameters of a communication system 200.

Figure 4:
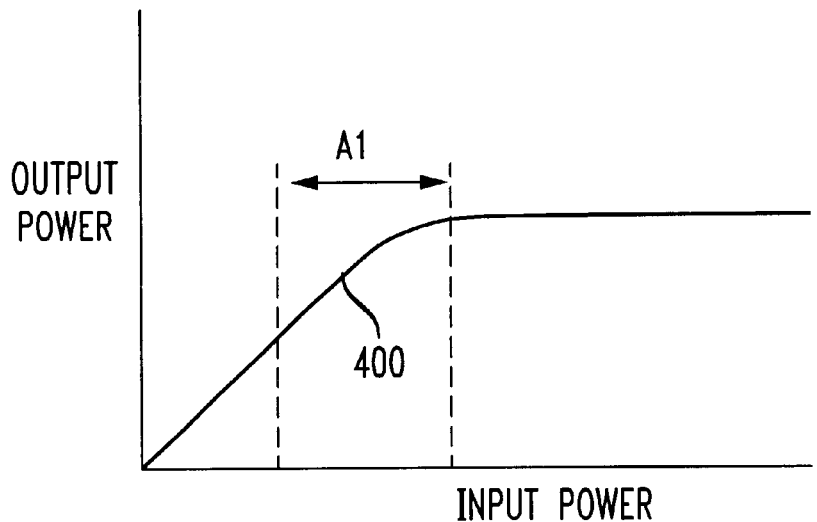
FIG. 4 illustrates gain compression for a typical semiconductor amplifier (SOA) operating in a nearly linear regime A1.

FIG. 4 illustrates the typical gain compression for each depicted SOA. It may be seen from FIG. 4, that SOA's are preferably operated in linear regime A1 of curve 400 for minimizing crosstalk. When operated in linear regime A1, rather than in a saturated regime as is conventional, it has been proven by our work that SOA's are less susceptible to power fluctuations and transients caused by added or dropped channels as depicted in FIG. 2 anywhere in a transmission line (or bursty data transmission as depicted in FIG. 3). That is, channels added or dropped, for example, at transmitter 205 or intermediate node 230 (FIG. 2) do not have a substantial adverse impact on through channel transmission. Neither do bursty channels like channel K (FIG. 3). The depicted graph of FIG. 4 is intended to be representative only of a linear operating region and linear regime A1 also may include a nearly linear regime, just prior to saturation, or may extend further into a linear region involving lower input power levels than would appear to be shown.

As suggested above, optical transmitter 205 can also operate in a bursty data transmission mode as represented in FIG. 3. For example, in our laboratory demonstration system per FIG. 5, the eight odd channels are continuously operated, and the eight even channels are toggled on/off, for example, using a 300 kHz sine wave to simulate bursty data. When the eight even channels are operated in burst mode, the Q factor for optical signals received at receiver 210 is only slightly degraded when compared to continuous operation of all sixteen channels or continuous operation of only eight channels. Now the results from our laboratory demonstration arrangement of FIG. 5 will be discussed with reference to FIGS. 6–9.

Figure 6A:
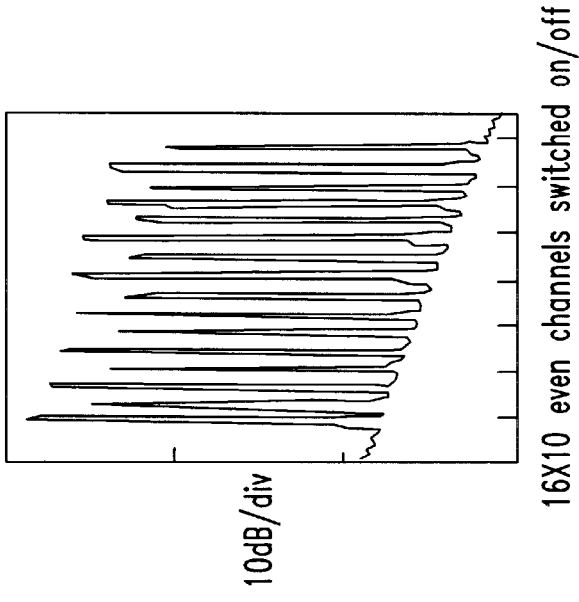
FIG. 6 illustrates the spectra obtained when eight channels in the communications system of FIG. 5 are added or dropped where FIG. 6(*a*) represents 16×10 Gb/s steady state, FIG. 6(*b*) represents 8×10 Gb/s steady state (even channels off) and FIG. 6(*c*) represents 16×10 Gb/s, where eight even channels are switched on/off with a 50% duty cycle, the vertical scale being 10 dB/division.
Figure 6B:
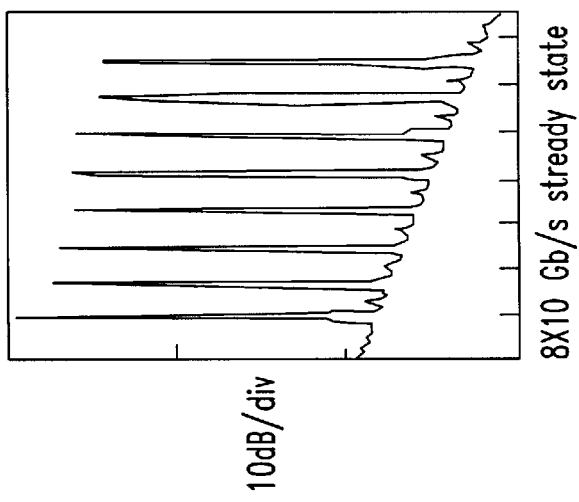
Figure 6C:
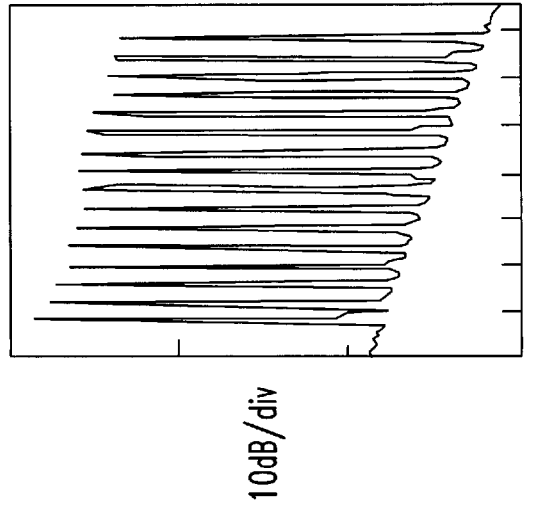

In our laboratory demonstration arrangement depicted in FIG. 5, we studied the spectra of sixteen transmitted channels, which spectra are depicted in FIG. 6. The vertical scale is 10 dB per division. FIG. 6 shows, on the same vertical scale, the spectra after the fifth semiconductor amplifier 550 at the end of the transmission line, (a) with all sixteen channels on, (b) with the eight even channels switched off, and (c) with the even channels toggled on/off with a 50% duty cycle. Comparing (a) to (b) one may see that reducing the channel count from sixteen to eight with a fixed per-channel input power increases the power in the remaining channels by only about a half a decibel. This indicates the low saturation level and near-linearity of operation of the SOA's of FIG. 5.

Figure 7:
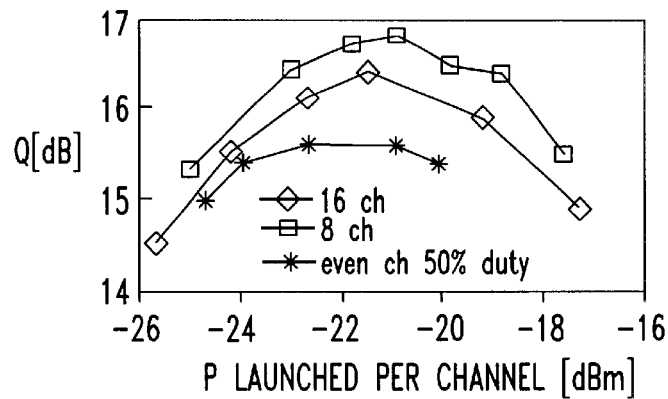
FIG. 7 illustrates the variation in Q-factor with input power when eight channels in the communications system of FIG. 5 are added or dropped.

FIG. 7 shows the quality of the received bit-pattern, as established by Q-factor measurements at the receiver. Q-factor is shown as the vertical scale in dB and the horizontal axis represents power P, the per channel launch power in dB referenced to one milliwatt into the first SOA 526. Each Q-value is a linear average over the eight continuously-on (odd) channels. This is done to average the +/−0.7 dB variation in Q among wavelengths caused by the polarization dependence of the SOA's. Three curves are shown. The top curve is for eight channel continuous operation. The middle curve is for sixteen channel continuous operation. The bottom curve represents eight continuous channels operating with eight even bursty channels switched with a 300 kHz square wave at 50% duty cycle. In each case, Q first increases with increasing signal power with increasing optical signal-to-noise ratio (OSNR) and then decreases at higher power due to increased cross-talk between channels. Importantly, the difference in Q-factors for eight and sixteen channel continuous operation is very small. The OSNR is uninfluenced by the 0.5 dB/channel change in amplifier gain (FIG. 6) because the signal and noise levels are affected by the same amount. The launched power for the measurements was set at a minus 21 dBm/channel, which is nearly optimum for sixteen channel transmission and slightly below optimum for eight channel transmission.

Figure 8:
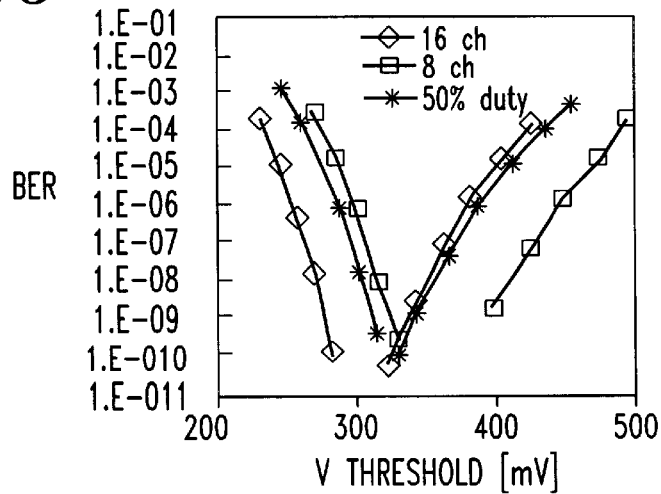
FIG. 8 illustrates the measurement of Q-factor as bit-error rate vs decision threshold for the communications system of FIG. 5 when eight channels are added or dropped.

FIG. 8 shows Q-factor measurements with bit error rate (BER) as the vertical axis and decision threshold voltage V in millivolts as the horizontal axis and the same three scenarios are plotted as in FIG. 7. The mechanism by which the Q-factor is slightly degraded by bursty modulation of the eight even channels is explained by the BER versus decision level data depicted in FIG. 8. The decision margin between the binary "zeroes" and "ones" rail is nearly the same for the eight and sixteen channel continuous operation states, leading to similar Q values. For fixed system input power and receiver attenuation settings, there is a slight (approximately a half decibel) power variation between the eight and sixteen channel cases which displaces the data rails. When the eight even channels are toggled as before, for example, by an AOM driven by a pulse generator, the resulting error distribution appears determined by the innermost rails of the eight and sixteen channel cases. This results in a Q value approximately 0.7 dB lower than for the steady state condition with all sixteen channels on.

Figure 9:
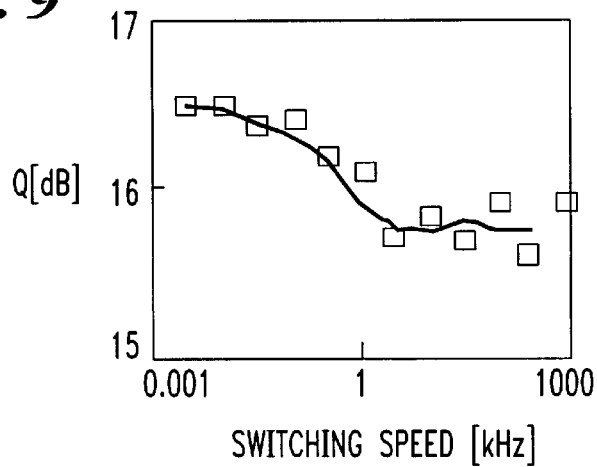
FIG. 9 illustrates the variation in Q-factor with frequency (modulation speed) of adding/dropping eight channels in the communications system of FIG. 5.

FIG. 9 illustrates the change in Q factor for optical signals received at the receiver of FIG. 5 when eight lasers are modulated with a fifty percent duty cycle square wave having a frequency range from 3 Hz to 1 MHz. Q is the vertical axis in dB while switching speed in kHz (1000 kHz='s 1 MHz, maximum value depicted) is the horizontal axis. Modulation speeds below 100 Hz are within the gain recovery time of EDFA 554 in the receiver of FIG. 5, and the change in Q factor is approximately 0.2 dB. When the eight even channels are toggled at higher frequencies in the range of 1 KHz to 1 MHz, the change in Q factor is approximately 0.7 dB, still a negligible value.

The minimal change in Q factor (i.e., 0.7 dB) is attributed to operating SOA's of our demonstration system in a nearly linear (unsaturated) regime as per FIG. 4. Also, due to the minimal change in Q factor, a system 200 according to the present invention is demonstrated to be suitable for transmitting bursty packet data at high data rates (for example, for Gigabit Ethernet applications).

Figure 1:
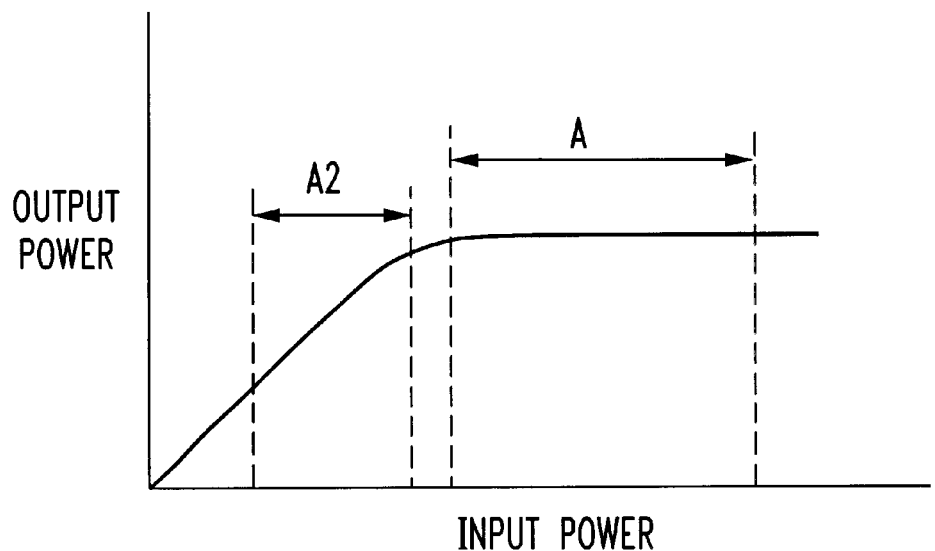
FIG. 1 illustrates gain compression for a conventional erbium-doped fiber amplifier (EDFA) where typical operation is in a saturated regime A as described above while an EDFA may also be operated in a linear regime A2 in accordance with the present invention.

In another preferred embodiment of the present invention, any SOA's may be replaced with conventional EDFA's. However, instead of operating the EDFA's in a saturation regime, such as saturation regime A shown in FIG. 1, the EDFA's are operated in a linear regime A2 as shown in FIG. 1, similar in shape to FIG. 4 for semiconductor optical amplifier operation. Each EDFA used, for example, in a trunk line or an optical ring may need a pump to increase the nearly linear regime of the gain compression to approximately 1 W. Therefore, the linear regime of the gain compression of EDFA's can provide an output power of 10–20 milliwatts (mW). A linear regime of an EDFA also can include a nearly linear regime, just prior to saturation or can include a linear region of operation at lower input power levels just like the semiconductor amplifiers.

In still another preferred embodiment of the present invention, any SOA's may be replaced with Raman amplifiers. Raman amplifiers can also be operated in a linear regime and minimize crosstalk and transients when they are used in a dynamic add/drop and/or burst mode communication system.

In the embodiments described above, any amplifiers operating in a linear regime may provide approximately one decibel of gain compression over the operating range for the signals transmitted on each WDM channel. From our experimentation, we can tolerate as much as three decibels of gain compression or enough gain compression to overcome the power loss in each span is provided by amplifiers operating in a near linear regime and without substantial adverse impact from transients or crosstalk.

The present invention is described in the context of a plurality of channels of an optical wavelength division multiplex signal where at least one channel is a through channel and another channel is switched, either switched on or added, switched off or dropped or switched because the channel is carrying bursty data of one's and/or zero's. The present invention may be utilized also to advantage in a communication system including a single switched channel where the transients caused by bursty data or on/off switching do not significantly adversely impact data transmission on that switched channel, the linear regime operation of any utilized amplifiers having a smoothing impact on the transients.

A communication system according to either FIG. 2 or 3 represents an exemplary embodiment of a communication system employing the principles of the present invention. Such a communication system may include multiple terminals having transmission and receiver circuitry, such as shown for transmitter 205 and receiver 210, for transmitting and receiving signals carried on WDM channels, and each terminal or intermediate fiber node can dynamically add/drop one or more of the WDM channels. A communication system according to the present invention can include multiple optical trunks having spans greater than or less than 40 km. Additionally, each optical trunk may include, fewer or more than four spans as depicted in our demonstration set-up of FIG. 5 and, thus, one or more linear optical amplifiers, depending on the desired transmission length of each optical trunk.

The present invention may be utilized in a large metropolitan setting, for example, an optical ring data network or may be utilized in long haul optical trunking, for example, long haul terrestrial or undersea systems. Consequently, distances traveled by optical signals utilizing the present invention to advantage may range into the thousands of kilometers.

What has been described are exemplary embodiments of the present invention. It, however, will be apparent to those skilled in the art that it is possible to embody the invention in specific forms other than those disclosed in the preferred embodiments described above. This may be done without departing from the spirit of the invention, and the preferred embodiments are merely illustrative and should not be considered restrictive in any way. The scope of the invention is given by the appended claims, rather than the preceding description.

What is claimed is:

1. A method of transmitting at least one wavelength division multiplexed (WDM) optical signal comprising at least one through channel and a switched channel in an optical network including at least one optical amplifier, the method comprising:

transmitting said at least one WDM optical signal through the optical amplifier, the optical amplifier being a semiconductor optical amplifier having a linear amplification region below a saturation region and biasing the optical amplifier in a voltage range below the saturation region, the through channel experiencing insubstantial transient impact from the switched channel.

2. The method of claim 1, wherein said at least one switched channel of said WDM optical signal carries bursty traffic.

3. The method of claim 1, wherein the step of amplifying further comprises a step of amplifying the transmitted WDM optical signal to provide at most one decibel of gain compression.

4. The method of claim 1, wherein the step of amplifying further comprises a step of amplifying the transmitted WDM optical signal to provide at most three decibels of gain compression.

5. The method of claim 1, wherein said linear amplification regime includes a nearly linear amplification regime.

6. The method of claim 1, wherein said at least one switched channel comprises a channel that has been added or dropped at said optical amplifier.

7. An WDM optical network operable to dynamically add/drop one or more channels from a WDM optical signal, the optical network comprising:

a transmitter transmitting at least one WDM optical signal comprising a plurality of WDM channels in said network, said WDM optical signal comprising at least one through channel and one switched channel;

an optical trunk connected to said transmitter and carrying said at least one WDM optical signal;

a receiver connected to said trunk and receiving said at least one WDM optical signal comprising said at least one through channel; and at least one optical amplifier connected between said transmitter and said receiver, the optical amplifier being a semiconductor optical amplifier having a linear amplification region below a saturation region, a voltage source biasing the optical amplifier in the linear amplification region, said through channel having no substantial adverse impact when said switched channel of said WDM optical signal is switched.

8. The network of claim 7, wherein said at least one switched channel carries bursty traffic.

9. The network of claim 7, wherein said at least one optical amplifier amplifies said at least one WDM optical signal to provide at most one decibel of gain compression.

10. The network of claim 7, wherein said at least one optical amplifier amplifies said at least one WDM optical signal to provide at most three decibels of gain compression.

11. The network of claim 7, wherein said at least one optical amplifier amplifies said WDM optical signal in said trunk.

12. The network of claim 7, wherein said at least one optical amplifier amplifies said WDM optical signal in said receiver.

13. The network of claim 7, wherein said linear amplification regime includes a nearly linear amplification regime.

14. The network of claim 7 further comprising an add-drop fiber node for adding or dropping at least one channel, said add-drop fiber node intermediate said transmitter and said receiver, the through channel experiencing insubstantial transient impact by adding or dropping said at least one channel at said add-drop fiber node.

15. A method of transmitting at least one WDM optical signal in an optical network, the optical signal comprising a first channel, a second channel, and at least one optical amplifier, the method comprising:

transmitting said at least one WDM optical signal through the optical amplifier; the optical amplifier being a semiconductor optical amplifier having a linear amplification region below a saturation region and biasing the optical amplifier in a voltage range in the linear amplification region, the first channel experiencing insubstantial transient impact from the transmission of data on said second channel.

* * * * *